United States Patent [19]

Nilssen

[11] Patent Number: 5,479,326
[45] Date of Patent: Dec. 26, 1995

[54] CEILING SYSTEM WITH READILY MOVABLE LIGHTING PANELS

[76] Inventor: Ole K. Nilssen, 408 Caesar Dr., Rte. 5, Barrington, Ill. 60010

[21] Appl. No.: 115,270

[22] Filed: Sep. 2, 1993

Related U.S. Application Data

[63] Continuation of Ser. No. 504,050, Apr. 5, 1990, abandoned, which is a continuation of Ser. No. 791,546, Oct. 25, 1985, abandoned, which is a continuation-in-part of Ser. No. 526,389, Aug. 25, 1983, Pat. No. 4,598,232, said Ser. No. 791,546 is a continuation-in-part of Ser. No. 569,188, Jan. 9, 1984, Pat. No. 4,651,059, Ser. No. 569,240, Jan. 9, 1984, Pat. No. 4,626,747, Ser. No. 573,423, Jan. 24, 1984, Pat. No. 4,667,133, Ser. No. 605,479, Mar. 30, 1984, Pat. No. 4,626,953, and Ser. No. 729,074, Apr. 30, 1985, Pat. No. 4,634,932, which is a continuation of Ser. No. 447,304, Jan. 18, 1983, abandoned, said Ser. No. 573,423, is a continuation of Ser. No. 450,187, Dec. 12, 1983, abandoned.

[51] Int. Cl.⁶ .................................................. F21S 3/02
[52] U.S. Cl. ........................ 362/148; 362/221; 362/225; 315/294; 315/DIG. 2
[58] Field of Search ..................... 362/145, 147, 362/148, 221, 222, 224, 225; 315/254, 294, DIG. 1, DIG. 2, DIG. 5

[56] References Cited

U.S. PATENT DOCUMENTS

| | | | |
|---|---|---|---|
| 2,721,929 | 5/1950 | Schwartz et al. | 362/258 |
| 3,081,398 | 3/1963 | Karth | 362/150 |
| 4,001,571 | 1/1977 | Martin | 362/225 |
| 4,158,793 | 6/1979 | Lewis | 315/DIG. 5 |
| 4,171,535 | 10/1979 | Westermann | 362/148 X |
| 4,362,971 | 12/1982 | Sloan, Jr. | 315/DIG. 5 |
| 4,369,487 | 1/1983 | Carlow | 362/258 |
| 4,626,747 | 12/1986 | Nilssen | 362/148 |
| 4,667,133 | 5/1987 | Nilssen | 362/148 |

FOREIGN PATENT DOCUMENTS 747249  11/1966  Canada ................................. 362/150

*Primary Examiner*—Stephen F. Husar

[57] ABSTRACT

A grid is suspended some distance below a permanent ceiling. The grid has plural grid openings. Each grid opening is covered by a regular ceiling panel or by a special light-weight lighting panel. Both the ceiling panels and the lighting panels are readily installable and movable, without requiring the making or breaking of hard-wire electrical connections. Each one of the lighting panels is powered by way of an individual flexible cord-and-plug means. This cord-and-plug means is plugged into a male receptacle on the lighting panel and into a female receptacle on a special power supply mounted on the permanent ceiling above this one ceiling panel. This special power supply has several such female receptacle means and can accommodate several ceiling panels. To power all the lighting panels of a complete ceiling, several of the special power supplies are used. To provide protection against fire initiation hazard, the power available from each individual female receptacle on each special power supply is limited in accordance with the specifications for Class-3 electrical circuits under the National Electrical Code. To provide for light weight in the lighting panels, the frequency of the voltage provided from the special power supplies is 30 kHz, thereby permitting the use of very light-of-weight components in the lighting panels.

22 Claims, 2 Drawing Sheets

CEILING SYSTEM WITH READILY MOVABLE LIGHTING PANELS

RELATED APPLICATIONS

Instant application is a continuation of Ser. No. 07/504,050 filed Apr. 5, 1990, now abandoned; which is a continuation of Ser. No. 06/791,546 filed Oct. 25, 1985, now abandoned; which is a continuation-in-part of Ser. No. 06/526,389 filed Aug. 25, 1983, now U.S. Pat. No. 4,598,232.

Ser. No. 06/791,546 is also a continuation-in-part of Ser. No. 06/569,188 filed Jan. 9, 1984, now U.S. Pat. No. 4,651,059; Ser. No. 06/569,240 filed Jan. 9, 1984, now U.S. Pat. No. 4,626,747; Ser. No. 06/573,423 filed Jan. 24, 1984, now U.S. Pat. No. 4,667,133 (which Ser. No. 06/573,423 is a continuation of Ser. No. 06/450,187 filed Dec. 12, 1983, now abandoned); Ser. No. 06/605,479 filed Mar. 30, 1984, now U.S. Pat. No. 4,626,953; Ser. No. 06/729,074 filed Apr. 30, 1985, now U.S. Pat. No. 4,634,932 (which Ser. No. 06/729,074 is a continuation of Ser. No. 06/447,304 filed Jan. 18, 1983, now abandoned).

BACKGROUND OF THE INVENTION

1. Field of Invention

The present invention relates to suspended ceiling systems, particularly of a kind that has readily movable light-weight lighting panels.

2. Description of Prior Art

Suspended ceilings of presently conventional designs have readily movable ceiling panels, but the lighting means used in these ceilings are permanently wired-in and not readily movable. As a result, an ordinary suspended ceiling is very difficult to re-configure, normally requiring the services of an electrician for relocating or removing the lighting means.

While it is possible to provide for lighting means that can be connected with the power line by way of disconnectable plug-and-receptacle means, in order to meet the safety requirements under the national Electrical Code, the required plug-and-receptacle means gets to be very elaborate and expensive. Moreover, presently available lighting means are very heavy to lift and cumbersome to move, thereby providing additional difficulties in connection with easy movability.

SUMMARY OF THE INVENTION

Objects of the Invention

A first object of the present invention is that or providing a suspended ceiling that is conducive to being very easily reconfigured in terms of locations of ceiling panels versus locations of lighting means.

A second object is that of providing a suspended ceiling system having lighting panels that are effectively operable to provide for ordinary general lighting requirements, yet substantially as easily installable and relocatable as are ordinary ceiling panels.

A third object is that of providing special light-of-weight lighting panels suitable for use in suspended ceilings, thereby to permit installation and relocation of these lighting panels in a manner substantially as simple and easy as that of installing and relocating ordinary ceiling panels.

These as well as other objects, features and advantages of the present invention will become apparent from the following description and claims.

BRIEF DESCRIPTION

A ceiling suspension grid is suspended some distance below a permanent ceiling. The grid has a plurality of grid openings; and each grid opening is covered either by a regular ceiling panel or by a special light-weight lighting panel, thereby forming an air plenum between the permanent ceiling and the suspended ceiling. Both the ceiling panels and the lighting panels are readily installable and relocatable, without requiring the services of an electrician.

To permit easy installation and removal, each individual one of the lighting panels is powered by way of an individual flexible cord-and-plug means. This cord-and-plug means is plugged into a male receptacle on the lighting panel and into a female receptacle on a special power supply mounted on the permanent ceiling nearby and above this one ceiling panel. This special power supply has several such female receptacle means, and can individually accommodate several ceiling panels. To power the lighting panels of a complete ceiling, several of the special power supplies are used.

To provide safety from fire initiation hazard, the voltage, current, and power available available from each individual female receptacle on the special power supply is limited in accordance with the specifications for Class-3 electrical circuits under the National Electrical Code; which implies that a maximum of 100 Watt is available from each receptacle means.

To provide for light weight in the lighting panels, the frequency of the voltage provided from the special power supply is much higher than the usual 60 Hz power line frequency. By using a frequency of 30 kHz, the components within the lighting panels can be very small and light of weight.

DESCRIPTION OF THE PREFERRED EMBODIMENT

Details of Construction

Figure 1:
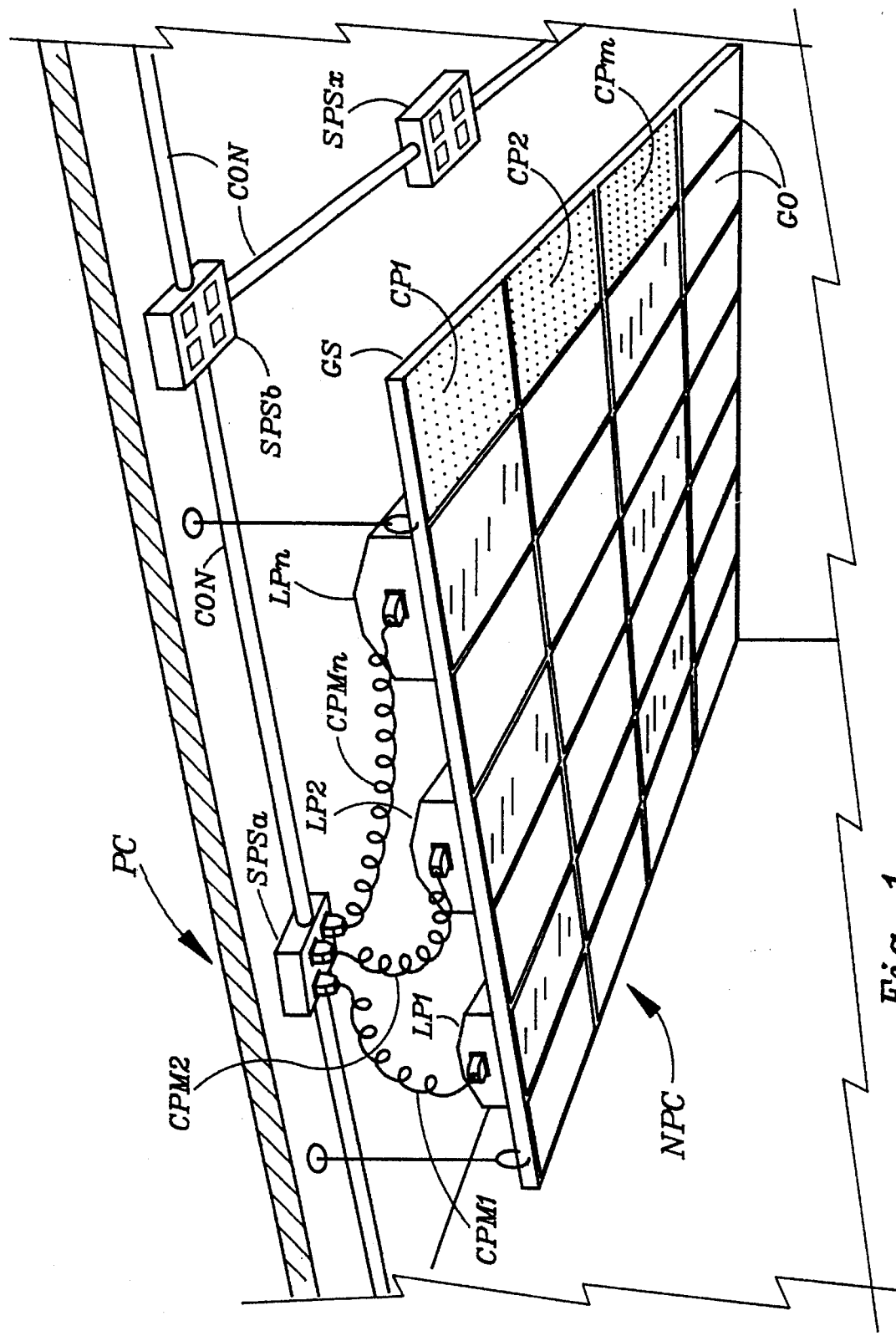
FIG. 1 illustrates the preferred embodiment of the invention and shows a suspended ceiling having a number of lighting panels powered from special ceiling-mounted multi-output power supplies by way of flexible cord-and-plug means.

FIG. 1 illustrates a suspended ceiling system in accordance with the present invention. Suspended from a permanent ceiling PC is a non-permanent ceiling NPC; which, except for the special light-of-weight lighting panels marked LP1, LP2 - - - LPn, is an ordinary so-called suspended ceiling having a grid structure GS of suspended T-bars and grid openings GO. These grid openings hold ceiling panels CP1, CP2 - - - CPm as well as lighting panels LP1, LP2 - - - LPn.

For sake of clarity, most of the grid openings are shown without being covered by any panels. In an actual installation, however, each grid opening would be covered by a ceiling panel or a lighting panel.

The lighting panels are individually connected with coiled-up flexible cord-and-plug means CPM1, CPM2 - - - CPMn with special power supplies SPSa, SPSb - - - SPSx; which special power supplies are each permanently mounted onto the permanent ceiling in manner similar to that of an ordinary junction box.

Each special power supply is connected with an ordinary electric utility power line by way of conductors located within ordinary electrical conduits CON—all in accordance with normal practices under the National Electrical Code for non-power-limited electrical circuits.

Figure 2:
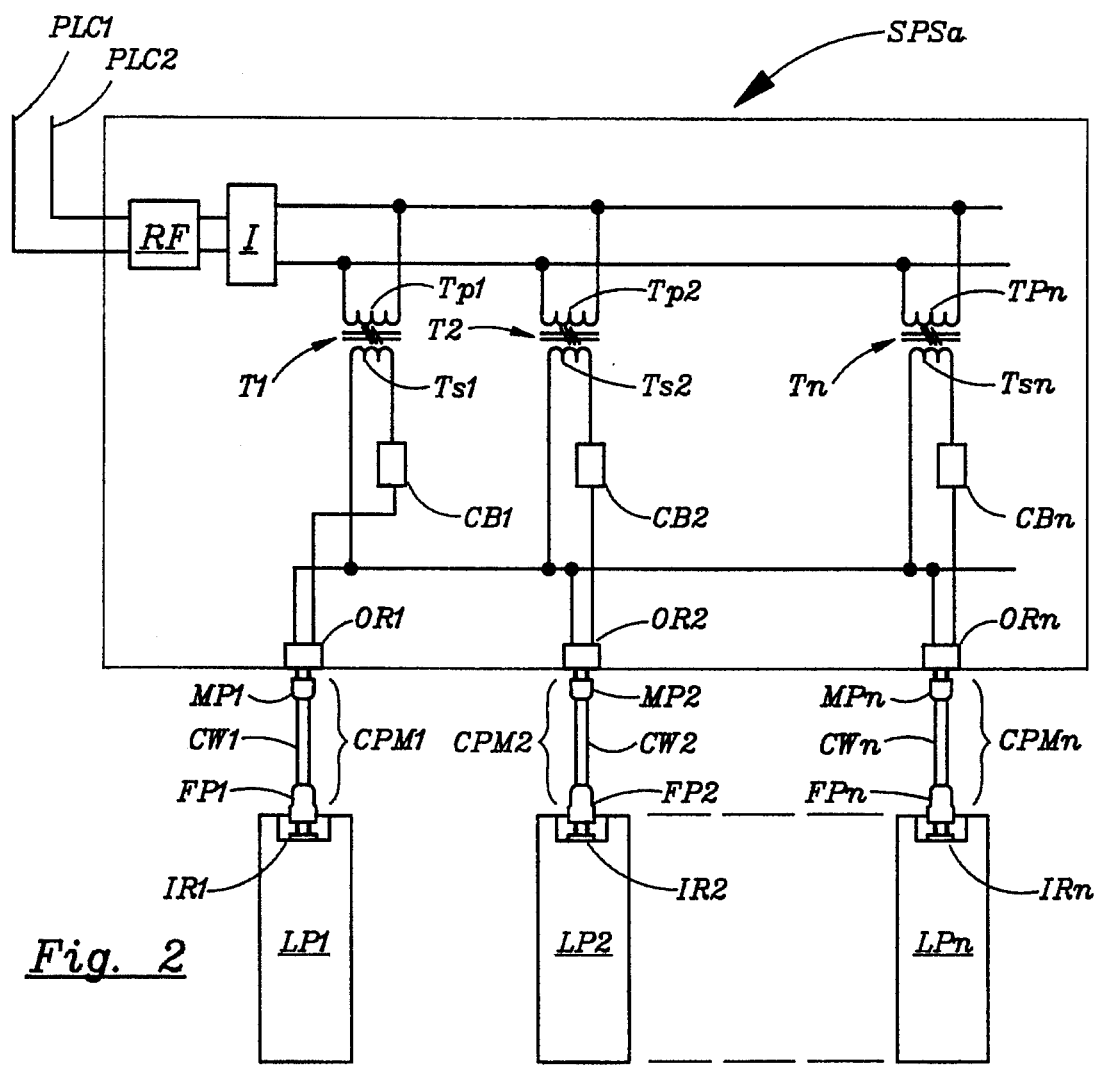
FIG. 2 schematically illustrates the preferred embodiment of one of these special power supplies with its plurality of high-frequency individually power-limited output receptacles as well as with its individual connections to a corresponding plurality of lighting panels.

FIG. 2 schematically illustrates one of the special power supplies of FIG. 1. This one special power supply is connected by way of cord-and-plug means CPM1, CPM2 - - - CPMn with associated lighting panels LP1, LP2 - - - LPn. This one special power supply is referred to as SPSa, and is shown powered from power line conductors PLC1 and PLC2.

Inside SPSa, power line conductors PLC1 and PLC2 are directly connected with a rectifier/filter combination RF, the substantially constant DC output voltage of which is applied to an inverter I.

The output from inverter I is a non-current-limited 30 kHz AC voltage, which AC voltage is applied to the primary windings Tp1, Tp2 - - - Tpn of current-limiting and isolating transformers T1, T2 - - - Tn. The outputs of the transformers are provided by secondary windings Ts1, Ts2 - - - Tsn, with each individual output being a current-limited 120 Volt/30 kHz voltage. These outputs are then provided to corresponding female output receptacles OR1, OR2 - - - ORn by way of over-current circuit breakers CB1, CB2 - - - CBn, all respectively.

By way of male plugs MP1, MP2 - - - MPn, conductive wire pairs CW1, CW2 - - - CWn, and female plugs FP1, FP2 - - - - FPn, the female output receptacles OR1, OR2 - - - ORn are connected with male input receptacles IR1, IR2 - - - IRn on lighting panels LP1, LP2 - - - LPn, all respectively.

The assembly consisting of rectifier and filter means RF, inverter I, transformers T1, T2 - - - Tn, circuit breakers CB1, CB2 - - - CBn, and output receptacles OR1, OR2 - - - - ORn, is referred to as special power supply SPSa.

Figure 3:
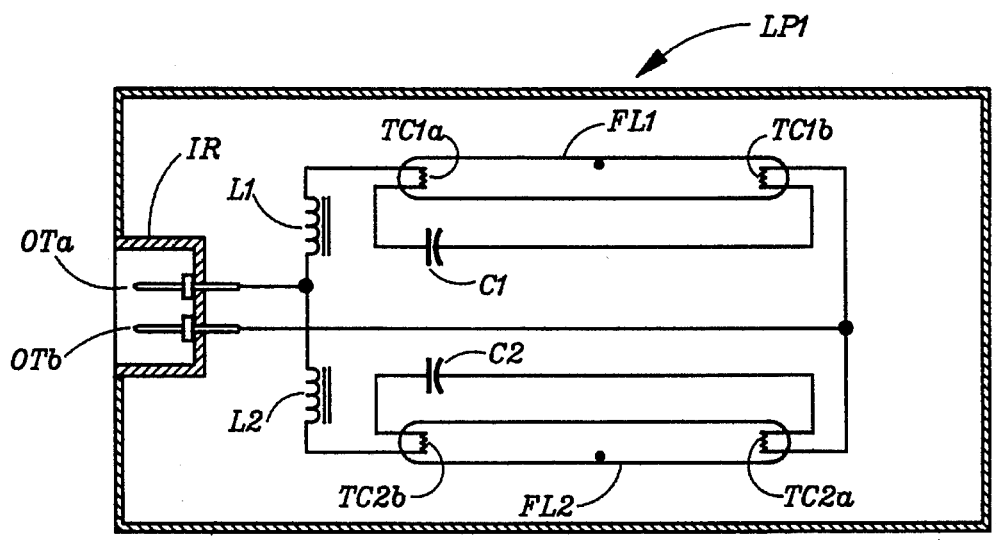
FIG. 3 schematically shows electrical circuit details of an individual lighting panel having fluorescent lighting means.

FIG. 3 illustrates the electrical details of one of the lighting panels referred to in FIG. 1 and FIG. 2 as LP1, LP2 - - - LPn. This one lighting panel is referred to as LP1. It has a male power input receptacle IR, which has two output terminals OTa and OTb, and comprises a pair of fluorescent lamps FL1 and FL2, a pair of corresponding ballasting inductors L1, L2 and ballasting capacitors C1, C2.

Fluorescent lamp FL1 has two thermionic cathodes TC1a and TC1b; and fluorescent lamp FL2 has two similar cathodes TC2a and TC2b.

Inductor L1 is connected between output terminal OTa and one of the terminals of cathode TC1a. Capacitor C1 is connected between the other terminal of cathode TC1a and one of the terminals of cathode TC1b. The other terminal of cathode TC1b is connected with output terminal OTb.

Inductor L2 is connected between output terminal OTa and one of the terminals of cathode TC2a. Capacitor C2 is connected between the other terminal of cathode TC2a and one of the terminals of cathode TC2b. The other terminal of cathode TC2b is connected with output terminal OTb.

Details of Operation

The operation and use of the suspended ceiling system of FIG. 1, which should be basically clear from the description of the details of construction, may be further described as follows.

Due to the relatively high frequency of the voltage provided from the special power supplies (SPSa, SPSb - - - SPSx of FIG. 1), the electrical components required within a fluorescent lighting panel (such as the one schematically illustrated by FIG. 3) are extremely compact and light of weight. For instance, to operate two F40/T12 four foot fluorescent lamps (which type of lamp represents by far the most commonly used type of fluorescent lamp), the total size and weight of the ballasting means are only be about two cubic inches and two ounces, respectively.

In comparison, an ordinary 120 Volt/60 Hz magnetic ballast for two F40/T12 four foot fluorescent lamps has a volume of about 60 cubic inches and weighs about 60 ounces.

Thus, by virtue of just size and weight advantage of the ballasting means, the fluorescent lighting panels of FIG. 1 can indeed be made exceptionally compact and light of weight. However, most of the potential weight saving can be attained due to the fact that the power supplied to the lighting panel is limited. Because of the limitation on the maximum power available to any of the lighting panels, the requirements for containing the lighting circuitry reduces substantially, thereby implying the freedom to use lighter gauge steel to cover the lighting circuitry, or even to use plastic. Thus, even aside from the lighter-weight ballasting means, the ceiling lighting panels of FIG. 1 can be made of substantially lighter-weight structural materials than is safely permissible with ordinary ceiling lighting fixtures.

In FIG. 1, each special power supply, SPSa, SPSb - - - SPSx, is powered by the 120 Volt/60 Hz regular power line in the manner illustrated by FIG. 2, and converts the 120 Volt/60 Hz power line voltage into several individual outputs, each one of which is provided at one of the several output receptacles in the form of a 120 Volt/30 kHz current-limited and over-current-protected voltage.

Thus, as indicated in FIG. 2, each of these special power supplies converts its 120 Volt/60 Hz input voltage to a 30 kHz output voltage; which output voltage is transformed by a current-limiting transformer (Ex. T1) to a magnitude of about 120 Volt RMS and is supplied to each individual one of the output receptacles (Ex: OR1) by way of over-current protection means in the form of circuit breakers (Ex: CB1).

The purpose of the circuit breakers is that of removing power from a given output receptacle in case an excess current flows for longer than a brief period of time: the more excessive the current, the shorter the time.

Thus, in case of a short-circuit or an overload condition caused by a given lighting panel (among the several lighting panels powered from a single special power supply), the power supplied to that given lighting panel will be interrupted by way of the particular circuit breaker associated with that given lighting panel—leaving the remaining lighting panels unaffected.

The fluorescent lamp ballasting arrangement shown in FIG. 3 is of a high-frequency resonant-type, and operates similarly to ballasting circuits previously described in published literature—such as, for instance, in U.S. Pat. No. 3,710,177 to Ward.

An important feature of these resonant or near-resonant ballasting circuits relates to the fact that they can be arranged to draw power from their source at a relatively high power factor. In other words, for a given current-flow, the resonant ballast provides for nearly the maximum possible power to be extracted from the source.

Additional Comments a) The lighting panels are distributed more-or-less evenly around the special power supply from which they receive their power. That is, the special power supply may be considered as being a hub from which power is distributed to its associated lighting panels by way of spokes radiating out from this hub. That way, distribution power losses are minimized; which is of particular importance due to the significant skin effect associated with distributing power at 30 kHz.

b) Each individual output of the special power supplies of FIG. 1 conforms to the Class-3 specifications of the National Electrical Code. The current-limiting transformer (Ex: T1) provides for the appropriate maximum permissible voltage magnitude as well as the requisite limit on maximum available current; and the circuit breaker (Ex: CB1) provides the requisite over-current-protection.

c) A current-limiting transformer, as used in the present context, is defined as a transformer that has been provided with a higher-than-usual leakage reactance between its primary and secondary windings, thereby providing a manifest limit on the maximum available output current.

d) It is very important that each of the special power supplies be able to provide its output power without incurring significant power losses. Such significant power losses would occur if the required voltage-limitation or current-limitation were to be accomplished by power dissipative means.

In the circuit arrangement of FIG. 2, however, the required voltage limitation is accomplished by transformer action, which is substantially non-power-dissipative. The rectifier/filter combination (RF) and the inverter (I) are both of conventional construction and therefore substantially non-power-dissipative.

The required current-limitation for each individual output is accomplished by way of a transformer with high leakage reactance, which represents a substantially non-power-dissipative way of achieving current-limitation.

e) Obviously, each special power supply must be able to operate with one or more of its output terminals being open-circuited, yet without incurring any significant power losses. Since, in the arrangement of FIG. 2, the voltage-limitation is attained by non-dissipative means, such open-circuited operation will indeed not result in any excessive power dissipation.

f) By reference, the National Electrical Code 1984 is herewith made part of this specification. The National Electrical Code is published by the National Fire Protection Association, Batterymarch Park, Quincy, Mass. 02269.

g) The reason that power limitation and Class-3 (or Class-2) operation of the lighting means in a suspended ceiling system is so important relates to the fact that most suspended ceilings are used to form an air plenum; which air plenum exists between the suspended ceiling and the permanent ceiling and is used as an active component part in the return path of the air flowing in a building's heating/cooling/ventilation system. Because of this fact, it is not permissible to make and break electrical connections by way of ordinary plug-and-receptacle means, except is the circuit to be made and broken is power-limited in accordance with Class-2 or Class-3 electrical circuits.

h) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. A ceiling system comprising:

a false ceiling suspended some distance below a permanent ceiling; the false ceiling having grid openings; each grid opening being covered by a movable cover means;

ceiling panels; each ceiling panel being functional to constitute one of these movable cover means;

lighting panels; each lighting panel being (i) individually connected by flexible electrical cable means with a source of high-frequency AC voltage and productive of providing light, and (ii) functional to constitute one of the movable cover means; and plural special power supplies mounted at spaced-apart points along the permanent ceiling; each special power supply (i) being connected with a power line voltage, (ii) having several separate outputs, and (iii) being located in a central location with respect to a group of several lighting panels; each of the separate outputs being operative to constitute the source of high-frequency AC voltage for one of the lighting panels in the group.

plural special power supplies mounted at spaced-apart points on the permanent ceiling; each special power supply (i) being connected with a power line voltage, (ii) having several separate outputs, and (iii) being located in a central location with respect to a group of several lighting panels; each of the separate outputs being operative to constitute the source of high-frequency AC voltage for one of the lighting panels in the group, thereby to supply its gas discharge lamp with an alternating current substantially void of any unidirectional component of current.

2. A ceiling system comprising:

a permanent ceiling;

a false ceiling suspended some distance below the permanent ceiling; the false ceiling having grid openings; each grid opening being covered by a movable cover means; there being a space between the false ceiling and the suspended ceiling;

plural power line access points disposed at spaced-apart locations in the space between the false ceiling and the permanent ceiling; each power line access point providing a primary AC voltage at a pair of primary power terminals; a first maximum amount of power being extractable from the primary power terminals; the first maximum amount of power being so large as to constitute a fire initiation hazard in case of a malfunction, such as a short circuit between the primary power terminals;

a power limiting means connected with each pair of primary power terminals; at least one of the power limiting means being operative to provide a secondary AC voltage at a pair of secondary power terminals; a second maximum amount of power being extractable from the secondary power terminals; the secondary AC voltage being substantially void of any DC voltage component; the second maximum amount of power being insufficiently large to constitute a fire initiation hazard in case of a malfunction, such as a short circuit between these secondary power terminals;

ceiling panels; each ceiling panel being operative to constitute one of the movable cover means; and lighting panels; at least one of these lighting panels having a pair of power input terminals connected by way of electrical cable means with the secondary power terminals of said at least one of the power limiting means and: (a) including a gas discharge lamp supplied with an alternating current; and (b) being operative (i) to provide light in response to said secondary AC voltage being supplied to its power input terminals, and (ii) to constitute one of the movable cover means.

3. The ceiling system of claim 2 wherein the frequency of the secondary AC voltage is substantially higher than that of the primary voltage.

4. The ceiling system of claim 2 wherein at least one of the power limiting means includes plural pairs of secondary power terminals; each such pair providing a secondary AC voltage; the maximum amount of power extractable from each such pair being insufficiently large to constitute a fire initiation hazard in case of a malfunction, such as a short circuit placed across each such pair of secondary power terminals.

5. The ceiling system of claim 2 wherein: (i) said cable means is a flexible power cord means; and (ii) is disconnectable by way of plug and receptacle means.

6. The ceiling system of claim 2 wherein said cable means is characterized by being extensible.

7. The ceiling system of claim 2 wherein at least one of the lighting panels comprises a gas discharge lamp means requiring for its proper starting and operation to be provided with a lamp starting and operating voltage; the magnitude of the lamp starting voltage being larger than that of the secondary voltage.

8. The ceiling system of claim 2 wherein at least one of the lighting panels comprises a gas discharge lamp means having a thermionic cathode and requiring for its proper operation to be provided with a cathode heating voltage as well as a lamp operating voltage.

9. The ceiling system of claim 2 wherein at least one of the lighting panels comprises an electrical receptacle means operative to receive and hold an electrical plug means.

10. The ceiling system of claim 2 wherein said second maximum amount of power is limited to about 100 Watt.

11. The ceiling system of claim 2 wherein the magnitude of any current drawn from the secondary terminals of said at least one of the power limiting means is, by way of means included within the power limiting means, prevented from exceeding about 1.0 Ampere on a continuing basis.

12. The ceiling system of claim 2 wherein, in the event of a short circuit being placed between the secondary terminals, the magnitude of any resulting current is prevented from exceeding about 1.0 Ampere on a continuing basis.

13. The ceiling system of claim 2 wherein the power limiting means includes means operative to prevent any substantive amount of current from flowing between said secondary power terminals and said primary power terminals.

14. A ceiling system comprising:

a permanent ceiling;

a false ceiling suspended some distance below the permanent ceiling; the false ceiling having grid openings; each grid opening being covered by a movable cover means; there being a space between the false ceiling and the suspended ceiling;

plural power line connection means positioned at spaced-apart locations on or underneath the permanent ceiling; each power line connection means providing a primary AC voltage at a pair of primary power terminals; no more than a first maximum amount of power being extractable from the primary power terminals; the first maximum amount of power being so large as to constitute a fire initiation hazard in case of a malfunction, such as a short circuit between the primary power terminals;

a conditioning means connected with each pair of primary power terminals; at least one of the conditioning means being operative to provide a secondary AC voltage at a pair of secondary power terminals; no more than a second maximum amount of power being extractable from the secondary power terminals; the second maximum amount of power being insufficiently large to constitute a fire initiation hazard in case of a malfunction, such as a short circuit between these secondary power terminals; the secondary AC voltage being substantially void of any DC voltage;

ceiling panels; each ceiling panel being operative to constitute one of the movable cover means; and lighting panels; at least one of these lighting panels having a gas discharge lamp and a pair of power input terminals connected by way of an electrical power cord with the secondary power terminals of said at least one of the power limiting means and being functional: (i) to supply an alternating current to the gas discharge lamp, thereby to provide light in response to said secondary AC voltage being supplied to its power input terminals; the alternating current being substantially void of any unidirectional current component; and (ii) to constitute one of the movable cover means.

15. The ceiling system of claim 14 wherein the electrical power cord is operative to connect between said secondary power terminals and said power input terminals by way of plug and receptacle means.

16. The ceiling system of claim 14 wherein the power limiting means comprises current limiting means as well as over-current protection means;

whereby, in case of a short circuit between the secondary power terminals, if the over-current protection means were to malfunction, the current limiting means will never-the-less function to manifestly limit the magnitude of any current flowing from the secondary power terminals.

17. The ceiling system of claim 14 wherein: (i) said at least one of these lighting panels includes a gas discharge lamp having a first and a second cathode; (ii) the first cathode has a first pair of cathode terminals; (iii) the second cathode has a second pair of cathode terminals; (iv) a lamp starting and operating voltage has to be provided between the two cathodes for proper lamp operation; (v) a first cathode voltage has to be provided between the first pair of cathode terminals for proper lamp operation; (vi) a second cathode voltage has to be provided between the second pair of cathode terminals for proper lamp operation; and (vii) said at least one of these lighting panels includes circuit means connected with the pair of power input terminals as well as with the two pairs of cathode terminals; the circuit means, even when being powered only from the secondary AC voltage being supplied between the pair of power input terminals, being operative to provide said lamp starting and operating voltage as well as said cathode voltages.

18. The ceiling system of claim 14 wherein: (i) said at least one of these lighting panels includes a gas discharge lamp having a first and a second cathode; (ii) the first cathode has a first pair of cathode terminals; (iii) the second cathode has a second pair of cathode terminals; (iv) a lamp starting and operating voltage has to be provided between the two cathodes for proper lamp operation; (v) a first cathode voltage has to be provided between the first pair of cathode terminals for proper lamp operation; (vi) a second cathode voltage has to be provided between the second pair of cathode terminals for proper lamp operation; and (vii) said at least one of these lighting panels includes circuit means connected with the pair of power input terminals as well as with the two pairs of cathode terminals; the circuit means being operative to provide said lamp starting and operating voltage as well as said cathode voltages even when being connected only with the pair of power input terminals and the first and second pairs of cathode terminals;

whereby the electrical power cord is operable to power said at least one of these lighting panels by way of only two electrical conductors.

19. An arrangement comprising:

a permanent ceiling in a building;

a source of power line voltage;

central power supplies; each central power supply (i) being mounted on the permanent ceiling, (ii) being connected with the source of power line voltage, and (iii) having plural power output receptacles; each power output receptacle having a pair of output terminals at which is provided an AC output voltage; the AC output voltage being of frequency substantially higher than that of the power line voltage;

a false ceiling suspended some distance below the permanent ceiling; the false ceiling having a grid structure and grid openings; each grid opening being covered by a removable cover means; and lighting panels; each lighting panel (i) being functional to serve as a removable cover means, (ii) having a power input cord with a power plug plugged into one of the power receptacles of one of the central power supplies, (iii) having a gas discharge lamp powered with alternating current void of any component of unidirectional current, and (iv) requiring for its proper operation to be provided with an AC voltage of frequency substantially higher than that of the power line voltage.

20. An arrangement comprising:

a permanent ceiling in a building;

a source providing at all times, except in case of failure at the source, a power line voltage at a pair of power line conductors; a relatively large amount of power being available from the power line conductors;

central power supplies; each central power supply (i) being mounted on the permanent ceiling, (ii) being connected with and drawing power from the power line conductors, and (iii) having output receptacles; each output receptacle providing an AC output voltage; only a relatively small amount of power being available from each output receptacle; the relatively small amount of power being substantially lower than the relatively large amount of power;

a false ceiling suspended some distance below the permanent ceiling; the false ceiling having a grid structure and grid openings; each grid opening being adapted to be covered by a removable cover means; and lighting panels; each lighting panel (i) being operative to serve as a removable cover means, (ii) having a power cord with a plug plugged into one of the output receptacles, and (iii) having a gas discharge lamp powered with an alternating current, the alternating current being defined as a current flowing alternatingly in one and then in the other direction through the lamp.

21. A ceiling system comprising:

a false ceiling suspended some distance below a permanent ceiling; the false ceiling having grid structure and grid openings; each grid opening being covered by a removable cover means;

ceiling panels; each ceiling panel being operative to constitute one of the removable cover means; and lighting panels; each lighting panel: (i) including a gas discharge lamp; (ii) being operative to connect with a source of manifestly current-limited AC voltage and, when indeed so connected, productive of providing light by supplying the gas discharge lamp with an alternating current; an alternating current being defined as a current flowing alternatingly and periodically in each of two directions; and (iii) being operative to constitute one of the removable cover means; the source: (i) being connected with an electric utility power line; (ii) being located externally of and remotely from the lighting panel; and (iii) including limiting means operative to prevent it from supplying current of magnitude in excess of a certain level, which certain level is substantially lower than the level of current being available directly the electric utility power line;

such that the ceiling panels as well as the lighting panels may be removed and replaced without requiring the use of tools; the lighting panels being properly operable only when powered from a source of current-limited AC voltage.

22. An arrangement comprising:

a permanent ceiling in a building;

a source of power line voltage;

central power supplies; each central power supply (i) being mounted on the permanent ceiling, (ii) being connected with the source of power line voltage, and (iii) having plural power output receptacles; each power output receptacle having a pair of output terminals at which is provided an alternating output voltage; the alternating output voltage being of frequency substantially higher than that of the power line voltage;

a false ceiling suspended some distance below the permanent ceiling; the false ceiling having a grid structure and grid openings; each grid opening being covered by a removable cover means; and lighting panels, each lighting panel: (i) being functional to serve as a removable cover means; (ii) having a power input cord with a power plug plugged into one of the power receptacles of one of the central power supplies; (iii) having a gas discharge lamp adapted to be powered with alternating current, the discharge lamp having a thermionic cathode required to be provided with cathode heating power; (iv) including provisions for supplying cathode heating power to the thermionic cathode; and (v) requiring for its proper operation to be provided with an alternating voltage of frequency substantially higher than that of the power line voltage.

* * * * *